(12) United States Patent
Meng et al.

(10) Patent No.: US 11,874,235 B2
(45) Date of Patent: Jan. 16, 2024

(54) ICE AND DEW DETECTION DEVICE AND METHOD BASED ON S-SHAPED MICROWAVE TRANSMISSION LINE

(71) Applicant: Min Meng, Wuxi (CN)

(72) Inventors: Min Meng, Wuxi (CN); Xiangyuan Zheng, Wuxi (CN)

(73) Assignee: Min Meng, Wuxi (CN)

( * ) Notice: Subject to any disclaimer, the term of this patent is extended or adjusted under 35 U.S.C. 154(b) by 0 days.

(21) Appl. No.: 18/038,450

(22) PCT Filed: Oct. 12, 2021

(86) PCT No.: PCT/CN2021/123169
§ 371 (c)(1),
(2) Date: May 24, 2023

(87) PCT Pub. No.: WO2022/134745
PCT Pub. Date: Jun. 30, 2022

(65) Prior Publication Data
US 2023/0400420 A1    Dec. 14, 2023

(30) Foreign Application Priority Data
Dec. 25, 2020  (CN) .......................... 202011555982.2

(51) Int. Cl.
*G01N 22/04* (2006.01)
*H04B 17/318* (2015.01)

(52) U.S. Cl.
CPC ........... *G01N 22/04* (2013.01); *H04B 17/318* (2015.01)

(58) Field of Classification Search
CPC  G01R 33/00; G01R 33/0358; G01R 33/0356; G01N 22/04; H04B 17/318; G06F 3/012; H01L 39/223
See application file for complete search history.

(56) References Cited

U.S. PATENT DOCUMENTS 4,543,823 A    10/1985 Nagy et al.
6,281,801 B1 *  8/2001 Cherry ................... G01N 22/04
                                                73/61.41
(Continued)

FOREIGN PATENT DOCUMENTS

CN    104141491 A    11/2014
CN    104237259 A    12/2014
(Continued)

*Primary Examiner* — Jermele M Hollington
*Assistant Examiner* — Taqi R Nasir

(57) ABSTRACT

A detection device and method based on an S-shaped microwave transmission line are provided. The detection device includes a metal housing, where the metal housing includes a sensor chamber communicating with an external environment and a circuit board chamber sealed off from the external environment; the sensor chamber includes at least one detection transmission line therein as an external S-shaped microwave transmission line; if there are multiple detection transmission lines, the multiple detection transmission lines are connected in series from end to end to form the external S-shaped microwave transmission line; the circuit board chamber includes an internal S-shaped microwave transmission line therein; and a head end of the external S-shaped microwave transmission line and a head end of the internal S-shaped microwave transmission line serve as microwave signal input terminals.

12 Claims, 3 Drawing Sheets

(56) References Cited

U.S. PATENT DOCUMENTS

2003/0042916 A1* 3/2003 Anderson .............. G01N 22/04
                                                                       324/643
2014/0368377 A1* 12/2014 Nadeau .................... H03L 7/26
                                                                       342/192

FOREIGN PATENT DOCUMENTS

| CN | 105424727 A | 3/2016 |
| --- | --- | --- |
| CN | 107238609 A | 10/2017 |
| CN | 109459450 A | 3/2019 |
| CN | 211477302 U | 9/2020 |
| CN | 112798621 A | 5/2021 |

* cited by examiner

ICE AND DEW DETECTION DEVICE AND METHOD BASED ON S-SHAPED MICROWAVE TRANSMISSION LINE

CROSS REFERENCE TO THE RELATED APPLICATIONS

This application is the national phase entry of International Application No. PCT/CN2021/123169, filed on Oct. 12, 2021, which is based upon and claims priority to Chinese Patent Application No. 202011555982.2, filed on Dec. 25, 2020, the entire contents of which are incorporated herein by reference.

TECHNICAL FIELD

The present disclosure relates to a detection device and method, in particular to an ice and dew detection device and method based on an S-shaped microwave transmission line, and belongs to the technical field of ice and dew detection.

BACKGROUND

Ice and dew detection is widely used in fields such as meteorology, road traffic, bridges, aircraft, power lines, communication lines, and others, and is an important component of the Internet of Things (IoT)-based meteorological system. At present, ice detection mainly adopts an optical or mechanical method, with low detection accuracy, low reliability, and high cost. Dew detection generally uses a conductivity method, which has low sensitivity, cannot accurately detect the changing dewing process, and only responds after the dewing process progresses to a certain extent.

Icing and dewing are two processes that can be converted from each other. In occasions with high humidity and large temperature changes, as the temperature decreases, dew first forms on surfaces of various objects, and then ice forms. Many existing sensors cannot detect both ice and dew simultaneously. Accurate detection of ice and dew is important for early warning for road traffic, bridges, and power lines.

SUMMARY

To overcome the shortcomings of the prior art, the present disclosure provides an ice and dew detection device and method based on an S-shaped microwave transmission line.

The present disclosure adopts the following technical solutions.

A detection device based on an S-shaped microwave transmission line includes a metal housing, where the metal housing includes a sensor chamber communicating with an external environment and a circuit board chamber sealed off from the external environment; the sensor chamber includes at least one detection transmission line therein as an external S-shaped microwave transmission line; if there are multiple detection transmission lines, the multiple detection transmission lines are connected in series from end to end to form the external S-shaped microwave transmission line; the circuit board chamber includes an internal S-shaped microwave transmission line therein; a head end of the external S-shaped microwave transmission line and a head end of the internal S-shaped microwave transmission line serve as microwave signal input terminals; and a tail end of the external S-shaped microwave transmission line and a tail end of the internal S-shaped microwave transmission line are configured to output signals to be compared.

In a further technical solution, in dry air, the external S-shaped microwave transmission line has a high-frequency impedance characteristic equivalent to a high-frequency impedance characteristic of the internal S-shaped microwave transmission line.

In a further technical solution, a center of the sensor chamber is provided with a central fixed shaft; the multiple detection transmission lines are evenly distributed around the central fixed shaft; and each of the detection transmission lines is spaced apart from the central fixed shaft and the metal housing.

In a further technical solution, a side wall of the sensor chamber is provided with multiple vents.

In a further technical solution, the circuit board chamber includes a microwave generator, a power divider, an amplitude and phase discriminator, and a signal processing circuit; an output terminal of the microwave generator is connected with an input terminal of the power divider, and two output terminals of the power divider are respectively connected with the head end of the external S-shaped microwave transmission line and the head end of the internal S-shaped microwave transmission line; the tail end of the external S-shaped microwave transmission line and the tail end of the internal S-shaped microwave transmission line are respectively connected with two input terminals of the amplitude and phase discriminator; and output terminals of the amplitude and phase discriminator are respectively connected with input terminals of the signal processing circuit.

In a further technical solution, the head and tail ends of the external S-shaped microwave transmission line are connected with a detection circuit in the circuit board chamber through a shielding wire; and a junction between the sensor chamber and the circuit board chamber for passage of the shielding wire is sealed and waterproof.

In a further technical solution, the metal housing is cylindrical, and includes a top end fixed to a mounting base; and an outgoing wire from the circuit board chamber is connected with the mounting base through a waterproof connector.

The detection method of the detection device based on an S-shaped microwave transmission line according to any one of the above paragraphs includes the following steps:

A detection method of the detection device based on an S-shaped microwave transmission line according to any one of the above paragraphs includes the following steps:

forming an environment in the sensor chamber with same temperature and humidity as in an external environment; sealing the circuit board chamber off from the external environment; and filling the circuit board chamber with atmospheric-pressure dry air;

inputting two microwave signals with same amplitude and phase to the head end of the external S-shaped microwave transmission line and the head end of the internal S-shaped microwave transmission line, respectively;

respectively outputting, by the tail end of the external S-shaped microwave transmission line and the tail end of the internal S-shaped microwave transmission line, two signals to be compared;

comparing the two signals to be compared, to acquire a phase difference signal and an amplitude difference signal; and determining, based on the phase difference signal and the amplitude difference signal, a state on the external S-shaped microwave transmission line, namely, ice and dew-free, iced, or dewed.

In a further technical solution, the detection method further includes: inputting, by the microwave generator, a microwave signal; and outputting, by the power divider, the two microwave signals with the same amplitude and phase to the head end of the external S-shaped microwave transmission line and the head end of the internal S-shaped microwave transmission line, respectively.

In a further technical solution, when the microwave signal is transmitted on the external S-shaped transmission line, an electromagnetic field is generated around a cross section of the external S-shaped transmission line; and when a thickness of an ice or dew layer falls within an action range of the electromagnetic field, the thickness of the ice or dew layer on the external S-shaped microwave transmission line is determined based on changes in the phase difference signal and the amplitude difference signal.

The present disclosure has the following advantages:

The present disclosure overcomes the shortcomings of the prior art. The present disclosure features a compact and simple structure, simple operation, easy implementation, high measurement accuracy, high repeatability and stability, and can achieve online real-time detection.

During detection, air can enter the sensor chamber through the vents of the metal housing and circulate freely. The temperature and humidity inside the sensor chamber can be balanced with the external environment.

Two microwave signals with the same phase and amplitude are transmitted on the internal S-shaped microwave transmission line and the external S-shaped microwave transmission line that are equivalent to each other. The two signals output from the tail end of the internal S-shaped microwave transmission line and the tail end of the external S-shaped microwave transmission line are compared to acquire the phase difference signal and amplitude difference signal of the two signals. The state and degree of icing or dewing on the external S-shaped microwave transmission line is determined based on the phase difference signal and the amplitude difference signal.

The present disclosure can detect both ice and dew, and has high practicality.

Figure 1:
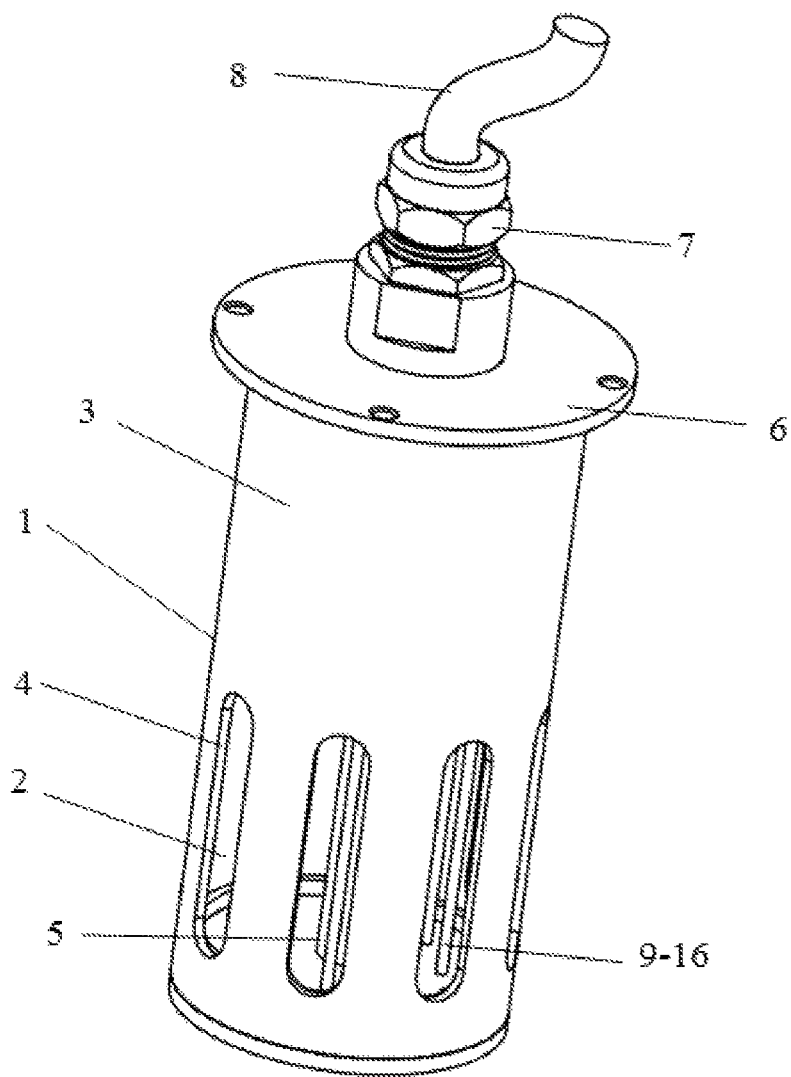
FIG. 1 is a schematic diagram of an ice and dew detection device according to an embodiment of the present disclosure.

Reference Numerals: 1. metal housing; 2. sensor chamber; 3. circuit board chamber; 4. vent; 5. central fixed shaft; 6. mounting base; 7. waterproof connector; 8. outgoing wire; 9. first external transmission line; 10. second external transmission line; 11. third external transmission line; 12. fourth external transmission line; 13. fifth external transmission line; 14. sixth external transmission line; 15. seventh external transmission line; 16. eighth external transmission line; 17. lower transmission line circuit board; 18. upper transmission line circuit board; 19. microwave generator; 20. power divider; 21. internal S-shaped microwave transmission line; 22. amplitude and phase discriminator. 23. phase difference signal; 24. amplitude difference signal; and 25. signal processing circuit.

DETAILED DESCRIPTION OF THE EMBODIMENTS

The specific implementations of the present disclosure are described in detail below according to the drawings.

FIG. 1 is a schematic diagram of an ice and dew detection device according to an embodiment of the present disclosure. As shown in FIG. 1, the detection device includes cylindrical metal housing 1, and the metal housing 1 includes sensor chamber 2 communicating with an external environment and sealed circuit board chamber 3.

A side wall of the sensor chamber 2 is provided with multiple evenly spaced vents 4 to facilitate the entry and exit of external air so as to form the same temperature and humidity within the sensor chamber 2 as the external environment. The circuit board chamber 3 is sealed and isolated from the external environment to prevent the entry and exit of external air and moisture. A circuit element in the sensor chamber 2 and a circuit element in the circuit board chamber 3 are connected by two microwave signal shielding wires. A junction between the sensor chamber 2 and the circuit board chamber 3 for the passage of the shielding wires is sealed and waterproof.

FIG. 1 also shows mounting base 6 provided on one end of the metal housing 1. Outgoing wire 8 from the circuit board chamber 3 is connected with the mounting base 6 through waterproof connector 7.

Figure 2:
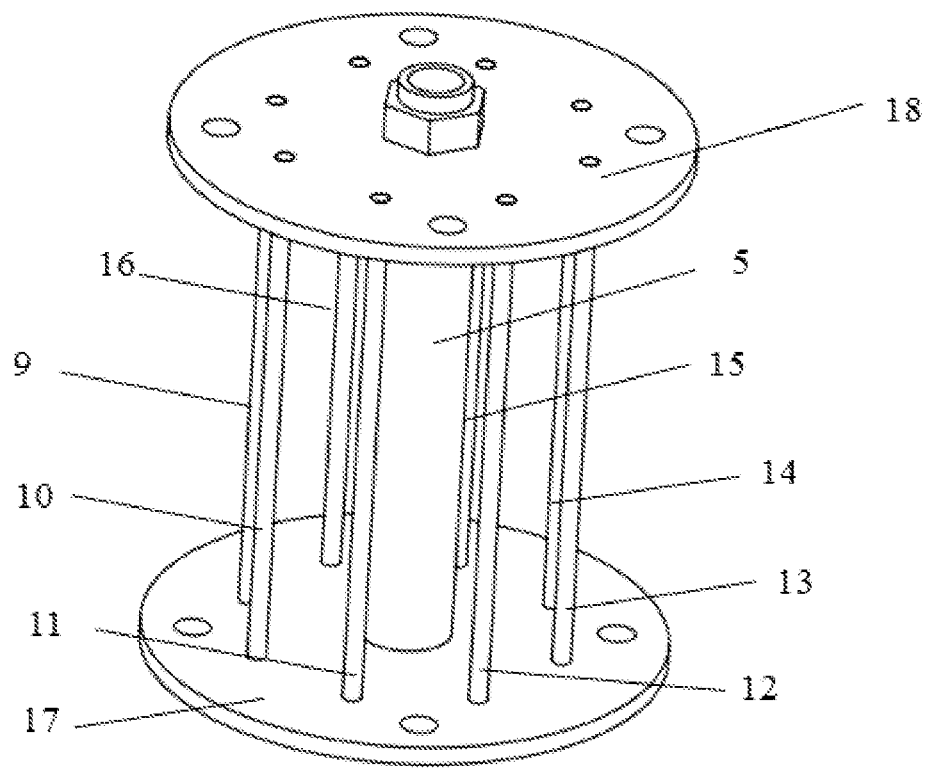
FIG. 2 is a structural diagram of an external S-shaped microwave transmission line according to an embodiment of the present disclosure.

The sensor chamber 2 includes at least one detection transmission line therein. The detection transmission line is made of copper or other metal with high thermal conductivity. FIG. 2 is a structural diagram of an external S-shaped microwave transmission line according to an embodiment of the present disclosure. In FIG. 2, the sensor chamber 2 is provided therein with eight detection transmission lines 9 to 16. The eight detection transmission lines 9 to 16 are welded and fixed through lower transmission line circuit board 17 and upper transmission line circuit board 18. A center of the sensor chamber 2 is provided with central fixed shaft 5, and the detection transmission lines 9 to 16 are evenly distributed around the central fixed shaft 5 in the sensor chamber 2. There is a certain distance between each of the detection transmission lines 9 to 16 and the central fixed shaft 5, and there is a certain distance between each of the detection transmission lines 9 to 16 and the metal housing 1.

Those skilled in the art may choose to provide one or more detection transmission lines (such as two, four, or eight in the embodiment) as needed. If only one detection transmission line is provided, the detection transmission line directly serves as the external S-shaped microwave transmission line. If multiple detection transmission lines are provided, the multiple detection transmission lines are sequentially connected in series from end to end to form the external S-shaped microwave transmission line. More detection transmission lines provided indicate a wider detection range.

Figure 3:
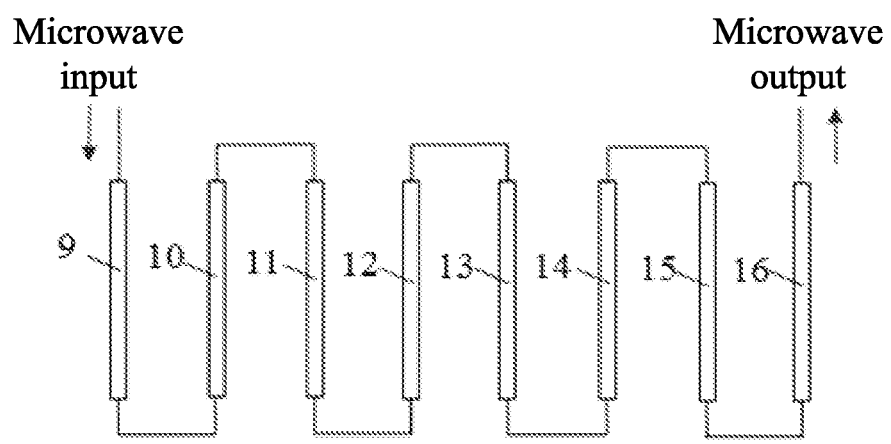
FIG. 3 is an electrical connection diagram of the external S-shaped microwave transmission line according to an embodiment of the present disclosure.

FIG. 3 is an electrical connection diagram of the external S-shaped microwave transmission line according to an embodiment of the present disclosure. As shown in FIG. 3, the eight detection transmission lines 9 to 16 are sequentially connected in series from end to end in an S-shaped structure to form the external S-shaped microwave transmission line. Head and tail ends of the external S-shaped microwave transmission line are connected with a circuit board of a detection circuit in the circuit board chamber 3 through the shielding wires. A microwave is input from the head end of the external S-shaped microwave transmission line and output from the tail end of the external S-shaped microwave transmission line.

Figure 4:
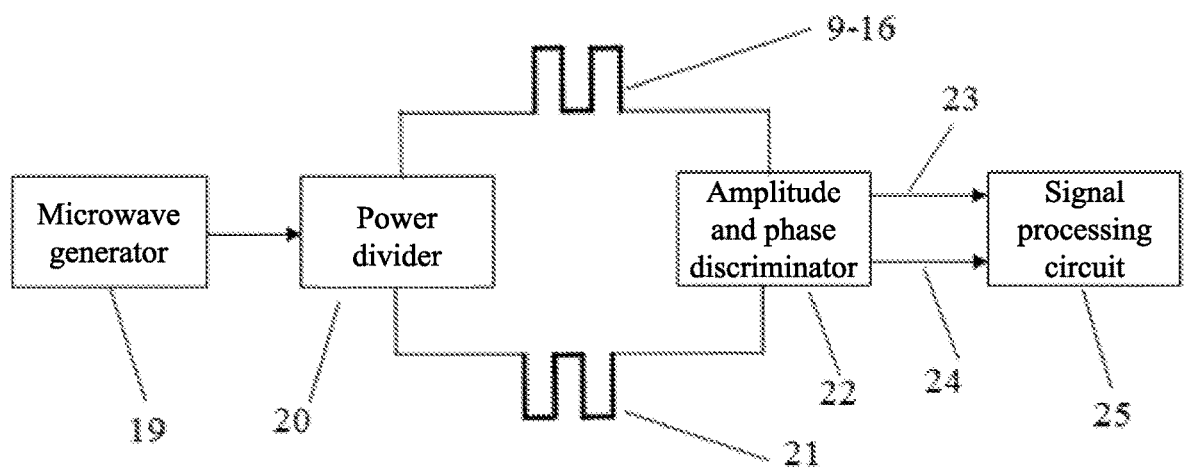
FIG. 4 is a block diagram of a detection circuit according to an embodiment of the present disclosure.

FIG. 4 is a block diagram of the detection circuit according to an embodiment of the present disclosure. The detection circuit is located in the circuit board chamber 3. As shown in FIG. 4, the circuit board chamber 3 includes internal S-shaped microwave transmission line 21, microwave generator 19, power divider 20, amplitude and phase discriminator 22, and signal processing circuit 25 therein. FIG. 4 further shows a method of connecting the external S-shaped microwave transmission line with the detection circuit. In dry air, a high-frequency impedance characteristic of the external S-shaped microwave transmission line is basically equivalent to a high-frequency impedance characteristic of the internal S-shaped microwave transmission line 21.

An output terminal of the microwave generator 19 is connected with an input terminal of the power divider 20, and two output terminals of the power divider 20 are respectively connected with the head end of the external S-shaped microwave transmission line and a head end of the internal S-shaped microwave transmission line 21. The tail end of the external S-shaped microwave transmission line and a tail end of the internal S-shaped microwave transmission line 21 are respectively connected with two input terminals of the amplitude and phase discriminator 22. Output terminals of the amplitude and phase discriminator 22 are respectively connected with input terminals of the signal processing circuit 25.

The present disclosure further provides a detection method using the ice and dew detection device based on an S-shaped microwave transmission line. The detection method specifically includes the following steps:

S1. The metal housing 1 is placed at a detection position. The sensor chamber 2 forms the same temperature and humidity as the external environment. The circuit board chamber 3 is sealed and isolated from the external environment. The circuit board chamber 3 is filled with atmospheric-pressure dry air.

Air can enter the sensor chamber 2 through the vents 4 of the metal housing 1 and circulate freely, so as to balance the temperature and humidity inside the sensor chamber 2 with the external environment. When the humidity is high and the temperature is low, and a dewing condition is met, dewing occurs on the external S-shaped microwave transmission line. A higher degree of dewing indicates more and thicker the dew adhered to the external S-shaped microwave transmission line. When the environment meets an icing condition, moisture from sources such as dew and rainwater forms an ice layer on the S-shaped microwave transmission line. A higher degree of icing indicates a thicker ice layer within a circumferential range of the microwave transmission line until the sensor chamber 2 is filled.

S2. The microwave generator 19 generates a high-frequency microwave signal. The microwave signal is transmitted to the power divider 20. The power divider 20 outputs two microwave signals with the same power. The two microwave signals have the same amplitude and phase, and are respectively input to the head end of the external S-shaped microwave transmission line and the head end of the internal S-shaped microwave transmission line 21.

S3. The tail end of the external S-shaped microwave transmission line and the tail end of the internal S-shaped microwave transmission line 21 are respectively connected with the input terminals of the amplitude and phase discriminator 22. The tail end of the external S-shaped microwave transmission line and the tail end of the internal S-shaped microwave transmission line 21 respectively output signals to be detected. The two signals to be detected are compared by the amplitude and phase discriminator 22.

S4. The output terminals of the amplitude and phase discriminator 22 output phase difference signal 23 and amplitude difference signal 24.

S5. The signal processing circuit 25 determines a state on the external S-shaped microwave transmission line based on the phase difference signal 23 and the amplitude difference signal 24, namely, ice and dew-free, iced, or dewed.

Specifically, in step S5, there may be three situations as follows.

S51. The external S-shaped microwave transmission line is in the air, the same as the internal S-shaped microwave transmission line 21. The two microwave signals output by the power divider 20 are transmitted at a same speed on the external S-shaped microwave transmission line and the internal S-shaped microwave transmission line 21, with same phase and amplitude changes. The phase difference signal 23 and the amplitude difference signal 24 output by the amplitude and phase discriminator 22 are fixed.

S52. The external S-shaped microwave transmission line is iced. Because the dielectric constant of ice is greater than that of air, the transmission speed of the microwave on the external S-shaped microwave transmission line is slightly lower than that on the internal S-shaped microwave transmission line 21, and the phase difference signal 23 changes. Due to the low conductivity of ice, the amplitude difference signal 24 does not change much.

S53. The external S-shaped microwave transmission line is dewed. Due to the fact that the dielectric constant of water is much greater than that of air and ice, the transmission speed of the microwave on the external S-shaped microwave transmission line is significantly reduced, and the phase difference signal 23 changes significantly. Due to the conductivity of water, the microwave amplitude decreases significantly, and the amplitude difference signal 24 changes significantly.

Therefore, in step S5, the phase difference and amplitude difference of the microwave signal on the external S-shaped microwave transmission line and the internal S-shaped microwave transmission line 21 are analyzed and calculated, so as to determine whether icing or dewing occurs.

Figure 5:
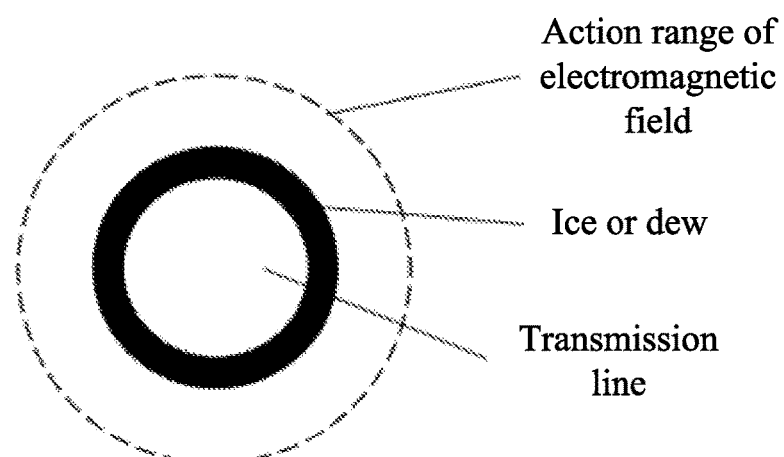
FIG. 5 is a schematic diagram of icing or dewing on the external S-shaped microwave transmission line according to the present disclosure.

The principle of the detection method is shown in FIG. 5. FIG. 5 is a schematic diagram of icing or dewing on the external S-shaped microwave transmission line according to the present disclosure. As shown in FIG. 5, when the microwave is transmitted on the external S-shaped transmission line, an electromagnetic field of a certain action range is generated around a cross section of the external S-shaped transmission line due to a skin effect of the microwave. In FIG. 5, the action range of the electromagnetic field is shown by a dotted line, and it is related to a microwave power. When the external S-shaped transmission line is iced, or dewed, the ice layer or dew adheres to the circumference of the external S-shaped transmission line and is within the action range of the electromagnetic field.

The transmission speed of the microwave on the transmission line is expressed as $V=C/\sqrt{\epsilon\mu}$, where $C$ denotes the speed of light, $\epsilon$ denotes the dielectric constant of a medium outside the transmission line, and $\mu$ denotes the magnetic permeability of the medium outside the transmission line. The magnetic permeability of air, ice, and, water is all 1, so the decisive factor is the dielectric constant of the outside medium. Generally, the dielectric constant of water is about 80, the dielectric constant of air is 1, and the dielectric constant of ice is about 3. Water, ice, and air are in descending order of dielectric constant. Therefore, when the transmission line is in water, ice, and air, the transmission speed of the microwave is different. The transmission speed of the microwave in air is close to the speed of light, greater than that in ice, followed by that in water.

In the detection device, when the external S-shaped microwave transmission line is iced and or dewed, the internal S-shaped microwave transmission line 21 is still in dry air. Therefore, there is a speed difference between the microwave signal on the external S-shaped microwave transmission line and the microwave signal on the internal S-shaped microwave transmission line 21, and such signal difference is reflected in the form of phase difference by the amplitude and phase discriminator 22.

According to the transmission speed equation of the microwave, the transmission speed of the microwave is not affected by the conductivity of the outside medium, but the conductivity of the outside medium can cause attenuation of the microwave amplitude. Generally, air is not electrically conductive, but water is electrically conductive because it includes impurities. When water solidifies into ice, the impurities included in water are solidified, so ice is not electrically conductive but assumes an insulating state. Therefore, air and ice have a small effect on the amplitude attenuation of the microwave signal, while water has a large effect on the amplitude attenuation of the microwave signal. The attenuation degree of the signal is reflected in the form of amplitude difference by the amplitude and phase discriminator 22.

Therefore, when the external S-shaped microwave transmission line is in air, the phase difference and amplitude difference output by the amplitude and phase discriminator 22 are fixed. When the external S-shaped microwave transmission line is iced, the phase difference signal 23 output by the amplitude and phase discriminator 22 changes slightly, and the amplitude difference signal 24 remains at a fixed value similar to that in air. When the external S-shaped microwave transmission line is dewed, the phase difference signal 23 and amplitude difference signal 24 output by the amplitude and phase discriminator 22 change significantly. Therefore, according to the changes in the phase difference signal 23 and the amplitude difference signal 24, the state on the external S-shaped microwave transmission line can be determined, namely, ice and dew-free, iced, or dewed.

Further, when the microwave is transmitted on the external S-shaped transmission line, the electromagnetic field is generated around the cross section of the external S-shaped transmission line. When the thickness of the ice or dew falls within the action range of the electromagnetic field, the thickness of the ice or dew on the external S-shaped microwave transmission line is determined based on the changes in the phase difference signal 23 and the amplitude difference signal 24.

A thicker ice layer on the external S-shaped microwave transmission line indicates a greater decrease in the microwave speed and a larger change in the phase difference signal 23 rather than the amplitude difference signal 24. A thicker dew layer on the external S-shaped microwave transmission line indicates a greater change in the amplitude difference signal 24, while the phase difference signal 23 changes accordingly. Therefore, when the state on the external S-shaped microwave transmission line, namely, ice and dew-free, iced, and dewed, is determined, the thickness of the ice or dew layer can be determined.

This is because the electromagnetic field of the microwave has a certain action range. As shown in FIG. 5, when the thickness of the ice or dew layer does not exceed the action range of the electromagnetic field, the air outside the ice or dew layer is still within the action range of the electromagnetic wave, which still affects the transmission speed of the microwave on the transmission line. When the thickness of the ice or dew layer exceeds the action range of the electromagnetic field, the effect on the microwave speed is saturated, and the excess ice or dew does not affect the microwave speed. Therefore, when the thickness of the ice or dew layer is within the action range of the electromagnetic field, the effect of the thickness of the ice or dew layer on the microwave speed is monotonically changeable. In other words, within the action range of the electromagnetic field, a greater thickness of the ice or dew layer indicates a smaller transmission speed of the microwave. The effect of the thickness of the ice or dew layer on the phase difference signal 23 is monotonically changeable. According to the transmission speed equation of the microwave, the effect of the thickness of dew on the microwave speed is much greater than that of the thickness of ice.

In addition, the thickness of ice does not affect the amplitude difference signal 24, but the thickness of dew affects the amplitude difference signal 24. This is also a monotonous change. A greater thickness of dew indicates a greater attenuation of the microwave amplitude and a greater change in the amplitude difference signal 24.

Therefore, the thickness of ice or dew on the external S-shaped microwave transmission line can be determined based on the changes in the phase difference signal 23 and the amplitude difference signal 24. Specifically, since the thickness is not linearly related to the phase difference and amplitude difference, those skilled in the art can calibrate it through icing and dewing experiments according to the method of the present disclosure.

In the embodiment of the present disclosure, the microwave signal generator, the power divider, and the amplitude and phase discriminator can adopt structural forms commonly used in the technical field.

In summary, the present disclosure allows two microwave signals with the same phase and amplitude to be transmitted on the external S-shaped microwave transmission line and the internal S-shaped microwave transmission line that are equivalent to each other. The present disclosure acquires the phase difference and amplitude difference of the two signals, and determines the state and degree of icing or dewing on the external S-shaped microwave transmission line based on the phase difference and amplitude difference. The present disclosure features a simple structure, easy implementation, wide applicability, high detection accuracy, and high stability, and can detect both ice and dew.

The above described content is intended to explain the present disclosure, rather than to limit the present disclosure. The scope of the present disclosure is subject to the claims. Any form of modification may be made to the present disclosure without violating the basic structure of the present disclosure.

What is claimed is:

1. An ice and dew detection device based on an S-shaped microwave transmission line, comprising a metal housing, wherein the metal housing comprises a sensor chamber communicating with an external environment and a circuit board chamber sealed off from the external environment;

the sensor chamber comprises multiple detection transmission lines therein as an external S-shaped microwave transmission line;

the multiple detection transmission lines are connected in series from end to end to form the external S-shaped microwave transmission line;

the circuit board chamber comprises an internal S-shaped microwave transmission line therein;

a head end of the external S-shaped microwave transmission line and a head end of the internal S-shaped microwave transmission line serve as microwave signal input terminals;

a tail end of the external S-shaped microwave transmission line and a tail end of the internal S-shaped microwave transmission line are configured to output signals to be compared, and by comparing two signals to be compared, a phase difference signal and an amplitude difference signal are acquired; a center of the sensor chamber is provided with a central fixed shaft;

the multiple detection transmission lines are evenly distributed around the central fixed shaft;

the detection transmission lines are spaced apart from the central fixed shaft and the metal housing;

a side wall of the sensor chamber is provided with multiple vents; and the circuit board chamber is filled with an atmospheric-pressure dry air.

2. The ice and dew detection device based on the S-shaped microwave transmission line according to claim 1, wherein when the detection device is in a dry air, the external S-shaped microwave transmission line has a high-frequency impedance characteristic equivalent to a high-frequency impedance characteristic of the internal S-shaped microwave transmission line.

3. The ice and dew detection device based on the S-shaped microwave transmission line according to claim 1, wherein the circuit board chamber comprises a microwave generator, a power divider, an amplitude and phase discriminator, and a signal processing circuit;

an output terminal of the microwave generator is connected with an input terminal of the power divider, and two output terminals of the power divider are respectively connected with the head end of the external S-shaped microwave transmission line and the head end of the internal S-shaped microwave transmission line;

the tail end of the external S-shaped microwave transmission line and the tail end of the internal S-shaped microwave transmission line are respectively connected with two input terminals of the amplitude and phase discriminator; and output terminals of the amplitude and phase discriminator are connected with input terminals of the signal processing circuit.

4. The ice and dew detection device based on the S-shaped microwave transmission line according to claim 1, wherein the head and tail ends of the external S-shaped microwave transmission line are connected with a detection circuit in the circuit board chamber through a shielding wire; and a junction between the sensor chamber and the circuit board chamber for passage of the shielding wire is sealed and waterproof.

5. The ice and dew detection device based on the S-shaped microwave transmission line according to claim 1, wherein the metal housing is cylindrical, and comprises a top end fixed to a mounting base; and an outgoing wire from the circuit board chamber is connected with the mounting base through a waterproof connector.

6. A detection method of the ice and dew detection device based on the S-shaped microwave transmission line according to claim 1, comprising the following steps:

forming an environment in the sensor chamber with same temperature and humidity as in the external environment; sealing the circuit board chamber off from the external environment; and filling the circuit board chamber with an atmospheric-pressure dry air;

inputting two microwave signals with same amplitude and phase to the head end of the external S-shaped microwave transmission line and the head end of the internal S-shaped microwave transmission line, respectively;

respectively obtaining, by the tail end of the external S-shaped microwave transmission line and the tail end of the internal S-shaped microwave transmission line, two signals to be compared;

comparing the two signals to be compared, to acquire a phase difference signal and an amplitude difference signal; and determining, based on the phase difference signal and the amplitude difference signal, a state on the external S-shaped microwave transmission line, namely, ice and dew-free, iced, or dewed.

7. The detection method according to claim 6, further comprising:

inputting, by a microwave generator, a microwave signal; and outputting, by a power divider, the two microwave signals with the same amplitude and phase to the head end of the external S-shaped microwave transmission line and the head end of the internal S-shaped microwave transmission line, respectively.

8. The detection method according to claim 6, wherein when the microwave signal is transmitted on the external S-shaped microwave transmission line, an electromagnetic field is generated around a cross section of the external S-shaped microwave transmission line; and when a thickness of an ice or dew layer falls within an action range of the electromagnetic field, the thickness of the ice or dew layer on the external S-shaped microwave transmission line is determined based on changes in the phase difference signal and the amplitude difference signal.

9. The detection method according to claim 6, wherein in the ice and dew detection device, when the detection device is in a dry air, the external S-shaped microwave transmission line has a high-frequency impedance characteristic equivalent to a high-frequency impedance characteristic of the internal S-shaped microwave transmission line.

10. The detection method according to claim 6, wherein in the ice and dew detection device, the circuit board chamber comprises a microwave generator, a power divider, an amplitude and phase discriminator, and a signal processing circuit;

an output terminal of the microwave generator is connected with an input terminal of the power divider, and two output terminals of the power divider are respectively connected with the head end of the external S-shaped microwave transmission line and the head end of the internal S-shaped microwave transmission line;

the tail end of the external S-shaped microwave transmission line and the tail end of the internal S-shaped microwave transmission line are respectively connected with two input terminals of the amplitude and phase discriminator; and output terminals of the amplitude and phase discriminator are connected with input terminals of the signal processing circuit.

11. The detection method according to claim 6, wherein in the ice and dew detection device, the head and tail ends of the external S-shaped microwave transmission line are connected with a detection circuit in the circuit board chamber through a shielding wire; and a junction between the sensor chamber and the circuit board chamber for passage of the shielding wire is sealed and waterproof.

12. The detection method according to claim 6, wherein in the ice and dew detection device, the metal housing is cylindrical, and comprises a top end fixed to a mounting base; and an outgoing wire from the circuit board chamber is connected with the mounting base through a waterproof connector.

\* \* \* \* \*